US011361206B2

(12) United States Patent
Lyle

(10) Patent No.: US 11,361,206 B2
(45) Date of Patent: *Jun. 14, 2022

(54) WIRELESS COMMUNICATIONS DEVICE WITH CONCEALED VALUE

(71) Applicant: UIPCO, LLC, San Antonio, TX (US)

(72) Inventor: Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/078,680

(22) Filed: Oct. 23, 2020

(65) Prior Publication Data

US 2021/0044010 A1 Feb. 11, 2021

Related U.S. Application Data

(63) Continuation of application No. 16/369,950, filed on Mar. 29, 2019, now Pat. No. 10,872,283.

(60) Provisional application No. 62/753,538, filed on Oct. 31, 2018.

(51) Int. Cl.
*G06K 19/06* (2006.01)
*G06K 19/07* (2006.01)
*H01Q 1/44* (2006.01)
*H04B 5/00* (2006.01)

(52) U.S. Cl.
CPC .......... *G06K 19/0723* (2013.01); *H01Q 1/44* (2013.01); *H04B 5/0025* (2013.01); *H04B 5/0062* (2013.01)

(58) Field of Classification Search
CPC .......... G06K 19/0614; G06K 19/0723; G06K 19/07758; H01Q 1/44; H04B 5/0025; H04B 5/0062
See application file for complete search history.

(56) References Cited

U.S. PATENT DOCUMENTS

| 8,063,028 B2 | 11/2011 | Phaneuf |
| 8,342,929 B2 | 1/2013 | Briggs et al. |
| 10,022,632 B1 | 7/2018 | McAdoo et al. |
| 10,717,005 B2 | 7/2020 | Kornmann |
| 10,835,817 B2 | 11/2020 | Itoh et al. |
| 10,872,283 B2 * | 12/2020 | Lyle .......................... H01Q 1/44 |

(Continued)

FOREIGN PATENT DOCUMENTS

| CN | 203937383 U | 11/2014 |
| CN | 102514827 B | 2/2015 |

(Continued)

OTHER PUBLICATIONS

International Preliminary Examination Report dated May 14, 2021 for PCT Application No. PCT/US2019/058449.

(Continued)

*Primary Examiner* — Thien M Le
(74) *Attorney, Agent, or Firm* — Plumsea Law Group, LLC

(57) ABSTRACT

A wireless communication device is disclosed. The wireless communication device has a near field communications transmitter system. The device has an outer chassis that can be sized, dimensioned and decorated to resemble common household items that lack any apparent value. The wireless communication device can also include an indicia that is invisible to an unaided human eye.

20 Claims, 4 Drawing Sheets

(56) References Cited

U.S. PATENT DOCUMENTS

| | | | |
|---|---|---|---|
| 2005/0285735 A1* | 12/2005 | Imura | H05B 1/0269 |
| | | | 340/539.27 |
| 2006/0187059 A1* | 8/2006 | Fabian | A61B 90/98 |
| | | | 340/572.8 |
| 2006/0258397 A1* | 11/2006 | Kaplan | H04M 15/00 |
| | | | 455/556.1 |
| 2009/0186694 A1 | 7/2009 | Gunawardana et al. | |
| 2010/0169296 A1* | 7/2010 | King | G16H 10/60 |
| | | | 707/706 |
| 2012/0019363 A1 | 1/2012 | Fein | |
| 2013/0108041 A1* | 5/2013 | Jordahl | H04L 9/0816 |
| | | | 380/44 |
| 2013/0154794 A1 | 6/2013 | Menard et al. | |
| 2013/0281206 A1 | 10/2013 | Lyons et al. | |
| 2013/0281207 A1 | 10/2013 | Lyons et al. | |
| 2013/0281208 A1 | 10/2013 | Lyons et al. | |
| 2014/0266589 A1 | 9/2014 | Wilder et al. | |
| 2014/0274365 A1 | 9/2014 | Riahei et al. | |
| 2014/0349755 A1 | 11/2014 | Itoh et al. | |
| 2015/0290545 A1* | 10/2015 | Barney | A63F 13/00 |
| | | | 463/32 |
| 2016/0067593 A1 | 3/2016 | Yim et al. | |
| 2016/0159535 A1* | 6/2016 | Diaz | B65D 51/245 |
| | | | 705/28 |
| 2016/0210484 A1 | 7/2016 | Shi et al. | |
| 2017/0065879 A1* | 3/2017 | Barney | A63F 13/65 |
| 2018/0293837 A1 | 10/2018 | Hoehne | |
| 2019/0367239 A1 | 12/2019 | Camenisch et al. | |
| 2021/0252384 A1 | 8/2021 | Li et al. | |

FOREIGN PATENT DOCUMENTS

| | | | |
|---|---|---|---|
| EP | 2722784 A1 | 7/2019 | |
| WO | 2020/092298 | 5/2020 | |

OTHER PUBLICATIONS

Invitation to Pay Additional Fees dated Jan. 9, 2020 for Application No. PCT/US2019/058449.

International Search Report and written opinion dated Mar. 3, 2020 for PCT Application No. PCT/US2019/058449.

Non-Final Office Action dated Feb. 5, 2022 in U.S. Appl. No. 17/103,201.

* cited by examiner

WIRELESS COMMUNICATIONS DEVICE WITH CONCEALED VALUE

CROSS-REFERENCE TO RELATED APPLICATIONS

This application is a continuation of U.S. application Ser. No. 16/369,950, filed on Mar. 29, 2019 and titled "Wireless Communications Device with Concealed Value", which application claims the benefit of U.S. Provisional Patent Application No. 62/753,538 filed Oct. 31, 2018, and titled "Wireless Communications Device with Concealed Value," the disclosures of which applications are incorporated by reference herein in their entirety.

TECHNICAL FIELD

The present disclosure generally relates to wireless devices, and in particular, to near field communications devices having a concealment feature.

BACKGROUND

Cash and credit cards, while convenient can also have drawbacks. Their obvious apparent value can result in theft. This is particularly a problem for the homeless and individuals that reside in shared housing. These individuals have no safe place to store their valuables. Because of this, they are required to carry all of their possessions, including cash, credit cards, and gift cards on their person at all times. This creates a potentially dangerous situation. There is a need in the art for a new solution that addresses these shortcomings.

SUMMARY

In one aspect, a wireless communication device that is capable of conducting contactless communications and transactions is provided. The wireless communications device can also include provisions to store information, including information related to an account, a balance, or a value. The device has an outer chassis including an interior cavity that is sized and dimensioned to retain the near field communications transmitter system. The outer chassis can also have an exterior surface defining an exterior shape. This exterior shape of the outer chassis can be generally cylindrical.

In another aspect, the wireless communication device can be sized, dimensioned and decorated to resemble common household items that lack any apparent value.

In another aspect, the wireless communication device includes an outer chassis including an interior cavity that is sized and dimensioned to retain a near field communications transmitter system. The outer chassis has an exterior surface, and the exterior surface includes an indicia that is invisible to an unaided human eye.

In another aspect, the indicia reflects a wavelength of light in the infrared spectrum.

In another aspect, the wireless communication device consists essentially of the near field communications transmitter system and no other electronic components.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Different embodiments of the invention provide a device to give the user the ability to securely carry and retain accessible funds. Unlike a normal form of payment, like a credit card, a debit card, or cash, various embodiments of the device may not appear to have apparent value. In fact, different embodiments may appear to be common everyday items that lack apparent value. This adds a level of discreetness and protection for the user. The device can help to reduce theft by concealing the true value of the device. Some embodiments of the device may include provisions for locating the device if it is lost or misplaced.

The embodiments may use any form of contactless communication technology. Contactless communication technology may include any known method including the use of radio-frequency identification (RFID), near field communication (NFC), WiFi, Bluetooth, and other similar wireless protocols. In some cases, the device may be configured to provide payment via interaction with an NFC reader or NFC tags programmed with secured payment information.

Figure 1:
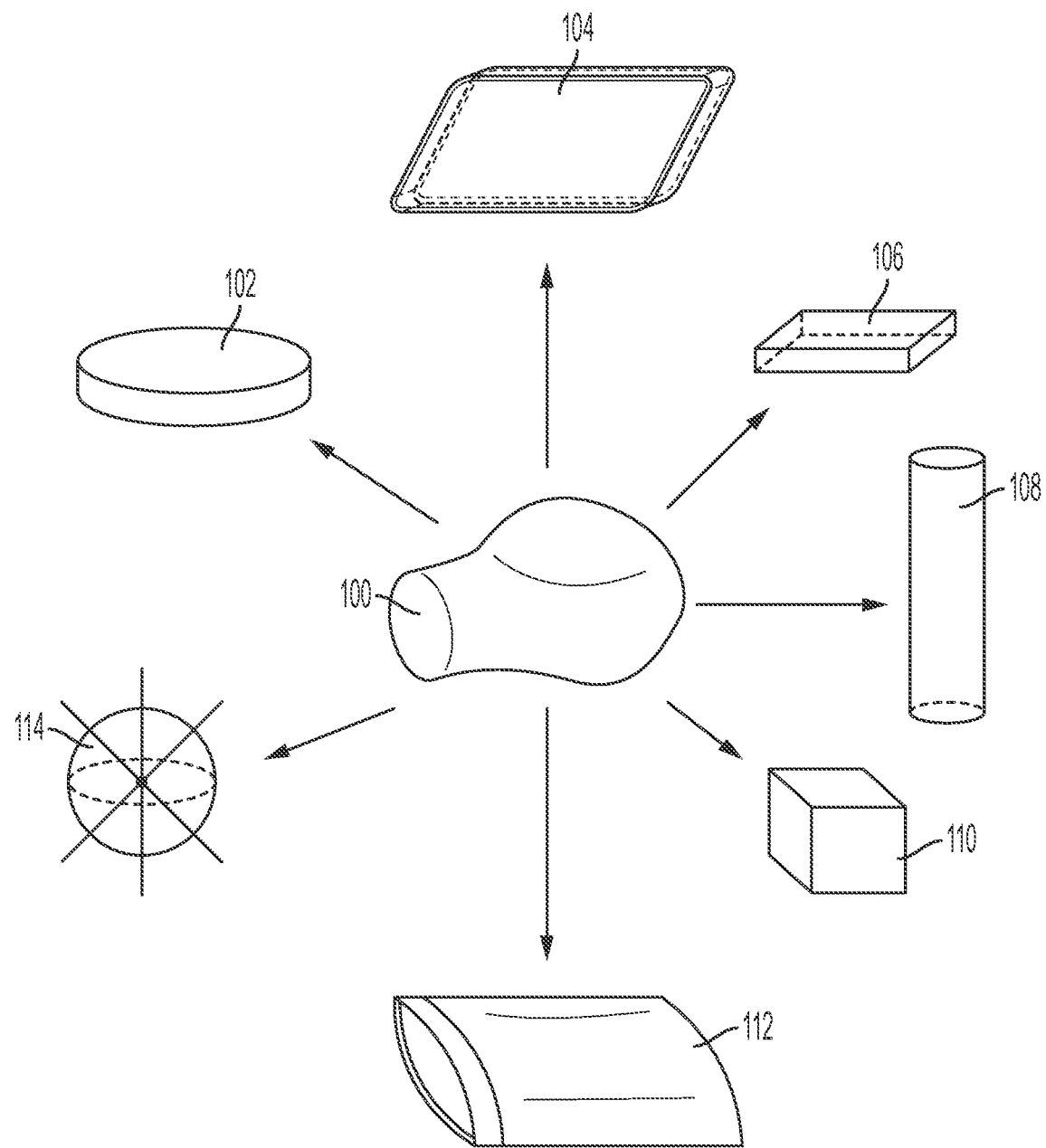
FIG. 1 is a schematic diagram of an embodiment of a generalized item in various possible forms.

Referring to FIG. 1, item 100 can take various different forms that can differ in shape and size. Generally, item 100 can take the overall form of any desired shape including the basic geometric shapes shown in FIG. 1. Some embodiments of item 100 may take form of flattened cylinder 102. Some embodiments of item 100 may take form of parallelepiped 104. Some embodiments of item 100 make take form of rectangular prism 106. Some embodiments of item 100 may take form of elongated cylinder 108. Some embodiments of item 100 may take form of cuboid 110. Some embodiments of item 100 may have a pillow shape 112. And some embodiments of item 100 may take form of sphere 114.

In addition to having an overall geometric shape, some embodiments of item 100 can appear similar to common real life objects. This can be accomplished by modifying, decorating or coloring a geometric shape so that the item 100 attains a shape and size similar to common everyday items. In some embodiments, item 100 attempts to mimic real life objects. Preferably, item 100 can be configured to be portable and small, so that item 100 can be easily carried by a user.

Figure 2:
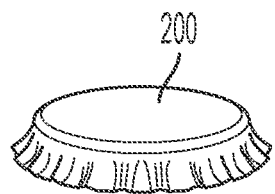
FIG. 2 is a schematic diagram of an embodiment of an item in the form of a bottle cap.

Referring to FIG. 2, some embodiments of item 100 can take the form of bottle cap 200. To properly mimic an actual bottle cap, item 100 may be sized and configured to resemble an actual bottle cap. Some embodiments of bottle cap 200 can also be colored or decorated to mimic a real bottle cap.

Figure 3:
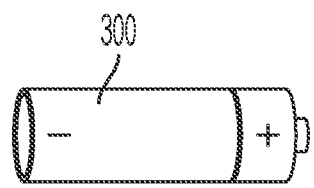
FIG. 3 is a schematic diagram of an embodiment of an item in the form of a battery.

Referring to FIG. 3, some embodiments of item 100 may be sized and configured to resemble commonly available battery 300. Battery 300 may appear as any standard battery size, including a AA battery, as shown in FIG. 3. However, item 100 may also take the form of different types of batteries such as AAA, C, D, or 9 volt. Some embodiments of battery 300 may also include markings that may appear similar to those found on a commonly available battery.

Figure 4:
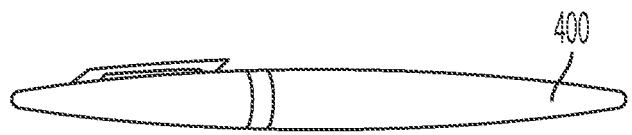
FIG. 4 is a schematic diagram of an embodiment of an item in the form of a writing implement.

Some embodiments of item 100 may take the form of a writing instrument. Referring to FIG. 4, item 100 may be sized and configured to resemble an actual capped pen 400. Although FIG. 4 illustrates capped pen 400, item 100 may be configured to resemble other types of writing instruments.

Figure 5:
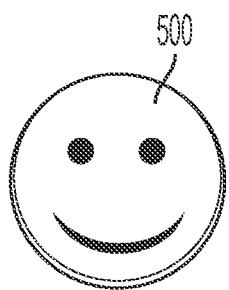
FIG. 5 is a schematic diagram of an embodiment of the front view of an item in the form of a decorative pin.
Figure 6:
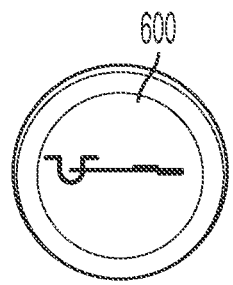
FIG. 6 is a schematic diagram of an embodiment of the rear view of an item in the form of a decorative pin.

Referring to FIG. 5, item 100 can take the form of a decorative pin 500. Pins come in a variety of different sizes, shapes and styles. Item 100 may be sized and configured to resemble any commonly available pin. In the embodiment shown in FIG. 5, decorative pin 500 is generally circular with an image of a cartoon smile printed on the exterior surface. FIG. 6 shows the reverse side, of decorative pin 500. Any suitable fastener may be used. In the embodiment shown in FIG. 6, decorative pin 500 includes a single pin and retaining hook on exterior surface 600 of the reverse side. The single pin may be used to secure decorative pin 500 to various articles including articles of apparel like shirts and jackets, or personal items like bags and backpacks.

Figure 7:
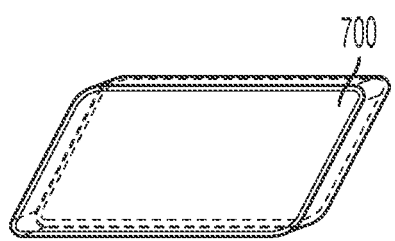
FIG. 7 is a schematic diagram of an embodiment of an item in the form of an eraser.
Figure 8:
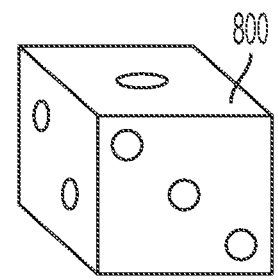
FIG. 8 is a schematic diagram of an embodiment of an item in the form of a die.

Referring to FIG. 7, embodiments of item 100 can take the form of eraser 700. Item 100 may be sized and configured to resemble an actual eraser. Eraser 700 illustrated in FIG. 7 has a generally prismatic shape but different embodiments of item 100 may take the form of an eraser having a different shape. Referring to FIG. 8, some embodiments of item 100 can take the form of die 800. The die 800 shown in FIG. 8 is a six sided die. Other embodiments of item 100 may be configured to resemble different kinds of die, like a four sided die, an eight sided die, a 20 sided die, or any other kind of die.

Figure 9:
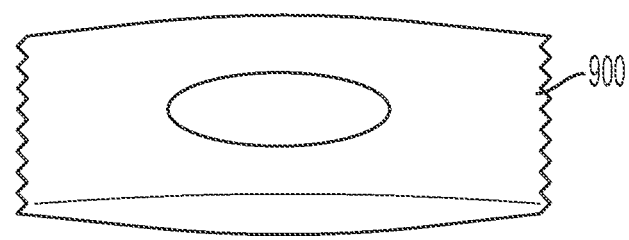
FIG. 9 is a schematic diagram of an embodiment of an item in the form of a condiment packet.

Referring to FIG. 9, some embodiments of item 100 can take form of condiment packet 900. Condiment packet 900 can include provisions that further enhance the ability of condiment packet 900 to resemble an actual condiment packet. In some embodiments, condiment packet 900 includes an internal resilient member. The internal resilient member can be a shaped piece of silicone or other resilient material. This internal resilient material may be contained within an outer cover, and sized and configured to resemble an unopened condiment packet.

Preferably, various configurations of item 100, as shown in FIGS. 2-9 include provisions that permit near field communication. Any of the embodiments shown in FIGS. 2-9 can include the following wireless communications features, however, for simplicity, one exemplary embodiment will be disclosed in detail, keeping in mind that the following features can be applied to any embodiment of item 100. In one example, bottle cap 200 (see FIG. 2) can include near field communication transmitter system 1004.

Figure 10:
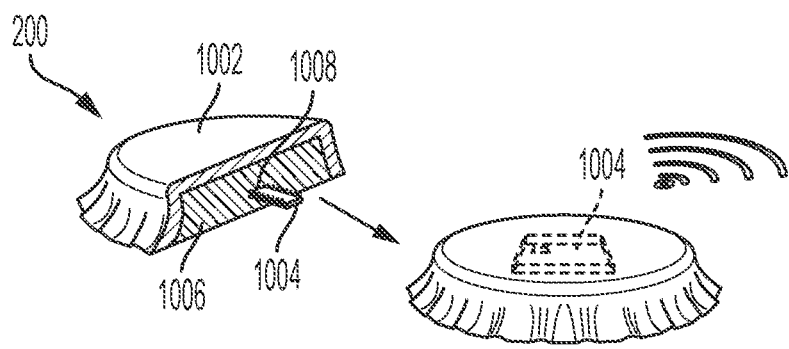
FIG. 10 is a schematic diagram of an embodiment of a wireless communications device showing both a cross-sectional view and an assembled view.

Near field communication transmitter system 1004 can be disposed externally, internally or in any suitable location with respect to item 100. In the embodiment shown in FIG. 10, near field communication system 1004 is disposed internally with respect to the external surface of bottle cap 200. As shown in FIG. 10, bottle cap 200 may include a shell 1002. In some embodiments, shell 1002 can be made of material that includes metal to more closely resemble an actual bottle cap. In some cases, shell 1002 may be too thin to internally accommodate near field communication transmitter system 1004. To internally mount near field communication transmitter system 1004, bottle cap 200 can also include filling 1006. Filling 1006 generally fills at least a portion of interior of shell 1002, and can provide adequate thickness to internally accommodate near field communication transmitter system 1004. Filling 1006 can be formed of a material that is different than the material of shell 1002. In the embodiment shown in FIG. 10, filling 1006 includes the internal cavity 1008. Preferably, internal cavity 1008 is sized and configured to receive and retain near field communication transmitter system 1004 internally, within its exposed exterior surface.

Figure 11:
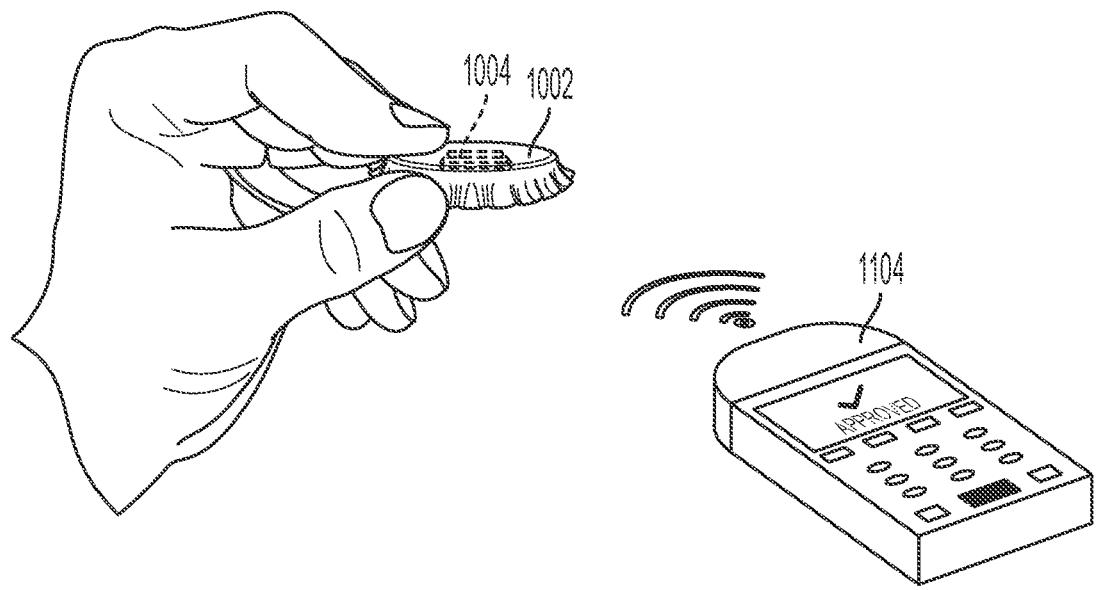
FIG. 11 is a schematic operational diagram of an embodiment of a wireless communications device.

FIG. 11 is an embodiment of bottle cap 200 in operation. Bottle cap 200 preferably includes near field communication transmitter system 1004 and can be used with a corresponding near field communication receiver 1104. In the embodiment shown in FIG. 11, bottle cap 200 may be manually placed proximate near field communication reader 1104. Preferably, the materials and construction in bottle cap 200 permits near field communication and preferably does not block any of the wireless signals that facilitate near field communication. In constructing bottle cap 200, materials may be selected that are permeable to wireless signals and permit near field communications.

Figure 12:
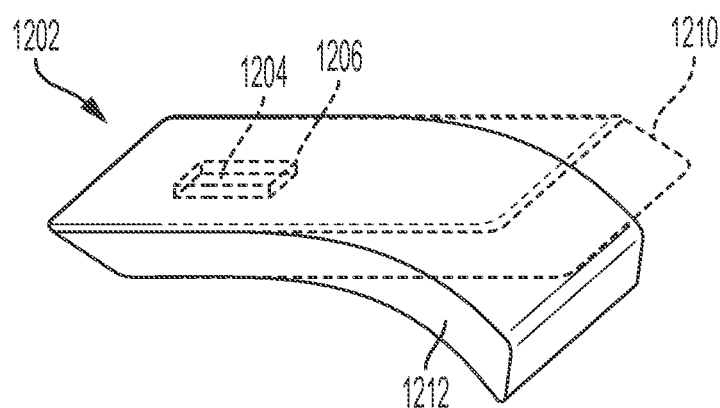
FIG. 12 is a schematic diagram of an embodiment of a wireless communications device in the form of an eraser.

FIG. 12 is another embodiment of item 100. Some embodiments can include provisions that help item 100 to further mimic real common everyday items. In some cases, this is accomplished by selecting materials that are relatively flexible. In the embodiment shown in FIG. 12, item 100 resembles an eraser 1202. For this embodiment, the material for eraser 1202 may be selected to provide flexibility. Eraser 1202 includes a chassis that is relatively more flexible than near field communication transmitter system 1204. Generally, embodiments of near field communication transmitter system 1204 are constructed of components mounted to a circuit board and will be about as flexible as a memory card, for example, a Secure Digital (SD) card or a micro SD card. In the embodiment shown in FIG. 12, eraser 1202 may be formed of a material that is more flexible than a memory card. This means that, assuming similar sizes and similar applied loads, eraser 1202 will elastically deflect to a greater extent than a memory card like device like near field communication transmitter system 1204. The relatively greater flexibility of eraser 1202 over near field communication transmitter system 1204 can also be observed in elastic bending, as shown in FIG. 12.

FIG. 12 shows eraser 1202 in an initial, non-deflected position 1210. Because eraser 1202 is formed of a relatively flexible material, eraser 1202 can deflect or bend under an applied load and attain a deflected position 1212. In the embodiment shown in FIG. 12, eraser 1202 experiences elastic deformation in bending and is capable of returning to its initial non-deflected position 1210. However, some embodiments permit plastic deformation where the item is permanently deformed after an applied load.

In the embodiment shown in FIG. 12 flexible eraser 1202 contains internal cavity 1206 that houses near field communication transmitter system 1204. The cavity is disposed within eraser 1202 and the flexibility of eraser 1202 can also provide protection and some shock resistance for near field communication transmitter system 1204.

Some embodiments can include provisions to securely identify item 100. Generally, an identification mark for item 100 can be either difficult to detect or is invisible to unassisted human vision. In some embodiments, identification mark 1406 can take the form of a reflective indicia that reflects wavelengths of light that are undetectable to the unassisted human eye. Any suitable wavelength of light beyond unassisted human vision may be used. In some embodiments the indicia can reflect wavelengths of light in the infrared spectrum that would not be detectable to the naked eye.

Figure 13:
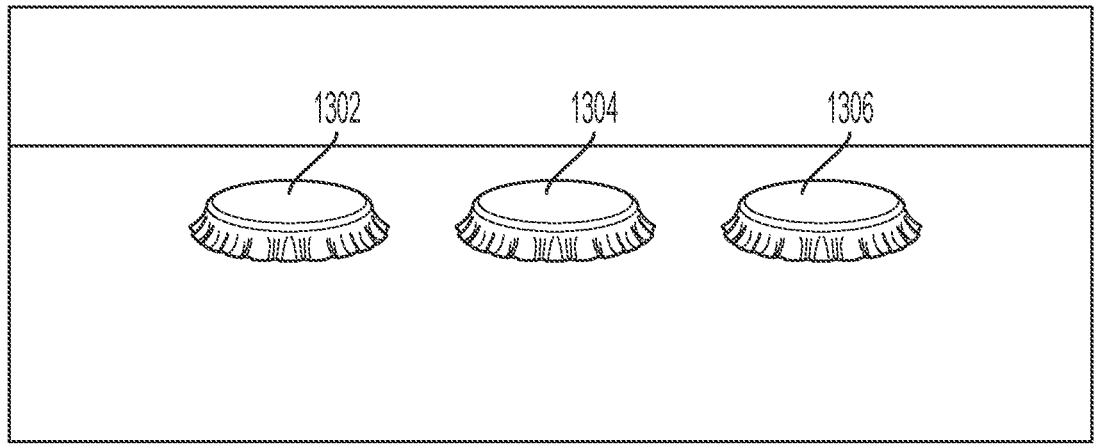
FIG. 13 is a schematic diagram of an embodiment of a wireless communications device along with other items.

FIG. 13 is an example of a number of bottle caps, some of which are conventional, and where one bottle cap is constructed in accordance with principles of the current invention and would include a near field communication transmitter system. FIG. 13 shows first bottle cap 1302, second bottle cap 1304 and third bottle cap 1306. FIG. 13 is a schematic drawing representing how these three bottle caps would appear to unassisted human vision. Without visual assistance, the three bottle caps 1302, 1304 and 1306 appear similar.

Figure 14:
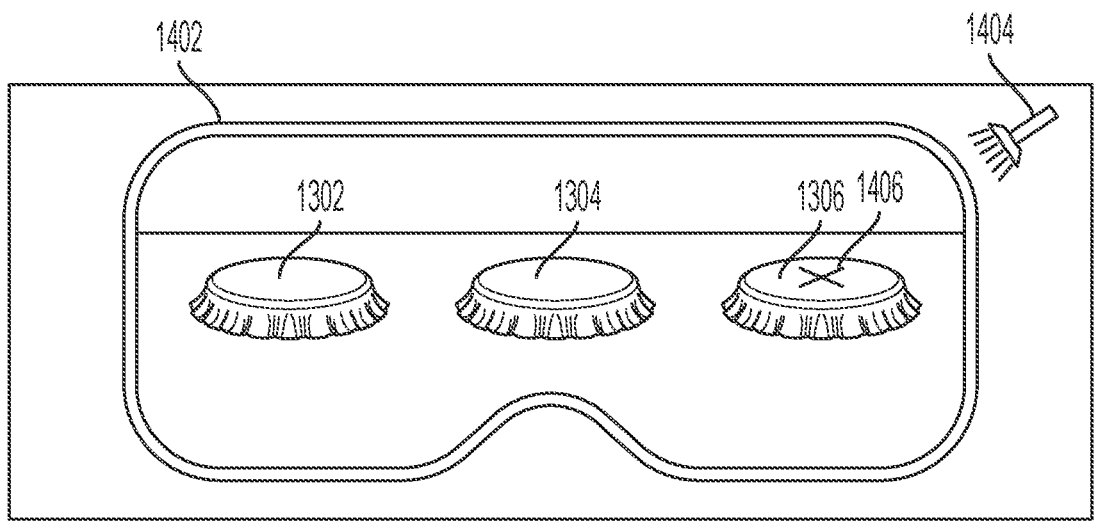
FIG. 14 is a schematic diagram of an embodiment of a wireless communications device along with other items seen through eyewear.

FIG. 14 is an exemplary view of the three bottle caps using assisted human vision. In this embodiment, eyewear 1402 is configured to detect wavelengths of light that are not generally visible to the unassisted human eye. In this embodiment, eyewear 1402 is tuned to detect wavelengths of light in the infrared spectrum. Generally, wavelengths greater than 700 nanometers, and in some cases greater than 750 nanometers may be considered to be a portion of the infrared spectrum. Some embodiments can include a light emitting device 1404 that emits light having a wavelength that generally corresponds to the light sensitivity of eyewear 1402.

In the embodiment shown in FIG. 14, first bottle cap 1302 and second bottle caps 1304 appear unmodified. However, a third bottle cap 1306 includes an indicia that is visible when eyewear 1402 is used. Referring to FIG. 13, note that indicia 1406 is not visible when bottle cap 1306 is viewed with unassisted human vision. In the embodiment of FIG. 14, indicia 1406 can be configured to reflect wavelengths of light in the infrared spectrum so that indicia 1406 is not visible under certain circumstances, but is only visible through the use of specially tuned eyewear 1402.

This identification feature can assist users who have lost or misplaced item 100. Because of the nature of item 100, an apparently worthless item, it would be possible that a misplaced item 100 may be discarded or disposed by individuals who are unaware of the true value of item 100. This kind of identification feature can help owners of item 100 to distinguish between unique items that include a near field communication transmitter system and common every day items with little value. This identification feature can also help users conduct searches for their unique items without revealing the concealed value of their item to bystanders.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A system comprising:
    a set of two or more items that have a substantially similar geometric shape, size, and appearance;
    wherein a first item of the set of two or more items is a real life object that lacks apparent value and is functional for an intended purpose; and
    wherein a second item of the set of two or more items is a wireless communication device that appears visually identical to the first item, but which is not functional for the intended purpose of the first item, the second item comprising:
        a contactless communications system configured to conduct contactless transactions for payment; the contactless communications system including a memory configured to store payment information, including payment information related to an account, a balance, or a value;
        an outer chassis including an interior cavity sized and dimensioned to retain the contactless communications system;
        the outer chassis having an exterior surface defining an exterior shape that is substantially similar to an exterior shape of the first item; and
        wherein the exterior surface is decorated so as to mimic the first item.

2. The system according to claim 1, wherein the exterior surface of the outer chassis is formed of a first material and a second material, wherein the first material is different than the second material.

3. The system according to claim 2, wherein the first material includes a metal and wherein the second material includes a non-metallic material.

4. The system according to claim 1, wherein the first item is an actual bottle cap functional for an intended purpose of sealing a bottle; and
    wherein the exterior shape of the outer chassis of the second item is sized and configured to resemble a bottle cap, but which is not functional to seal a bottle.

5. The system according to claim 1, wherein the first item is an actual writing instrument functional for an intended purpose of writing; and
    wherein the exterior shape of the outer chassis of the second item is sized and configured to resemble a writing instrument, but which is not functional for writing.

6. The system according to claim 1, wherein the exterior surface of the outer chassis of the second item includes an indicia that is invisible to an unaided human eye.

7. The system according to claim 6, further comprising eyewear configured to detect wavelengths of light that are generally not visible to the unaided human eye; and
wherein the indicia on the exterior surface of the outer chassis of the second item is visible with the eyewear.

8. The system according to claim 7, wherein the first item lacks an indicia that is invisible to an unaided human eye.

9. The system according to claim 8, wherein only the indicia on the second item in the set of two or more items that have a substantially similar geometric shape, size, and appearance is visible with the eyewear.

10. The system according to claim 6, wherein the indicia reflects a wavelength of light in the infrared spectrum.

11. A method of constructing a wireless communication device that mimics a real life object that lacks apparent value and is functional for an intended purpose, comprising:
providing a contactless communications system configured to conduct contactless transactions for payment; the contactless communications system including a memory configured to store payment information, including payment information related to an account, a balance, or a value;
forming an outer chassis having an exterior surface defining an exterior shape that is sized and configured so as to be similar in size and shape to the real life object that lacks apparent value, but which outer chassis is not functional for the intended purpose of the real life object;
providing an interior cavity within the outer chassis, the interior cavity being sized and dimensioned to retain the contactless communications system; and
decorating the exterior surface so as to mimic the real life object that lacks apparent value to appear visually identical to the real life object but which does not function for the intended purpose of the real life object.

12. The method according to claim 11, wherein the real life object that lacks apparent value is an actual writing instrument functional for an intended purpose of writing; and
wherein the method comprises decorating the exterior surface of the wireless communication device to resemble an appearance of the actual writing instrument, but which is not functional for writing.

13. The method according to claim 11, wherein the real life object that lacks apparent value is an actual bottle cap functional for an intended purpose of sealing a bottle; and
wherein the method comprises decorating the exterior surface of the wireless communication device to resemble an appearance of the actual bottle cap, but which is not functional to seal a bottle.

14. The method according to claim 11, further comprising:
marking the exterior surface of the wireless communication device with an indicia that is invisible to an unaided human eye.

15. The method according to claim 14, wherein the wireless communication device appears identical to the object that lacks apparent value to an unaided human eye; and
wherein the indicia on the wireless communication device is only visible using eyewear configured to detect wavelengths of light that are generally not visible to the unaided human eye so as to distinguish the wireless communication device from the object that lacks apparent value.

16. A method of identifying a wireless communication device from a set of two or more items that have a substantially similar geometric shape, size, and appearance, comprising:
providing a first item in the set of two or more items that is a real life object that lacks apparent value and is functional for an intended purpose;
providing a second item in the set of two or more items that is the wireless communication device that appears visually identical to the first item, but which is not functional for the intended purpose of the first item;
providing the second item that is the wireless communication device with an outer chassis having an exterior surface defining an exterior shape that is sized and configured so as to be similar in size and shape to the first item that is the real life object that lacks apparent value;
marking the exterior surface of the second item that is the wireless communication device with an indicia that is invisible to an unaided human eye;
using eyewear configured to detect wavelengths of light that are generally not visible to the unaided human eye to identify the second item that is the wireless communication device from the first item that is the real life object that lacks apparent value when the first item and the second item are viewed together.

17. The method according to claim 16, wherein the indicia reflects a wavelength of light in the infrared spectrum.

18. The method according to claim 16, wherein the second item that is the wireless communication device appears visually identical to the first item that is the real life object that lacks apparent value to an unaided human eye.

19. The method according to claim 16, wherein the first item that is the real life object that lacks apparent value is an actual writing instrument functional for an intended purpose of writing; and
wherein the exterior surface of the second item that is the wireless communication device is decorated to resemble an appearance of the actual writing instrument, but which is not functional for writing.

20. The method according to claim 16, wherein the first item that is the real life object that lacks apparent value is an actual bottle cap functional for an intended purpose of sealing a bottle; and
wherein the exterior surface of the second item that is the wireless communication device is decorated to resemble an appearance of the actual bottle cap, but which is not functional to seal a bottle.

* * * * *